US006865482B2

(12) United States Patent
Hull

(10) Patent No.: US 6,865,482 B2
(45) Date of Patent: Mar. 8, 2005

(54) METHOD AND ARRANGEMENT FOR GUIDING A USER ALONG A TARGET PATH

(75) Inventor: Richard Hull, Westbury-on-Trym Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/635,874

(22) Filed: Aug. 5, 2003

(65) Prior Publication Data

US 2004/0030494 A1 Feb. 12, 2004

(30) Foreign Application Priority Data

Aug. 6, 2002 (GB) .............................................. 0218188
Oct. 11, 2002 (GB) .............................................. 0223658

(51) Int. Cl.[7] .............................................. G01C 21/30
(52) U.S. Cl. .................. 701/211; 379/142.01; 379/202; 379/266; 370/310; 455/39
(58) Field of Search ....................... 379/142.01, 142.17, 379/142.07, 142.08, 202, 206, 266, 203, 204, 1.02, 41, 88.03, 88.04; 370/266, 62, 260, 263, 267, 310; 381/1, 17; 340/995.1, 990, 995, 988, 996; 455/39, 456; 701/211, 209, 202

(56) References Cited

U.S. PATENT DOCUMENTS

| 4,991,126 A | | 2/1991 | Reiter ......................... 364/561 |
| 5,334,987 A | | 8/1994 | Teach ......................... 342/357 |
| 5,889,843 A | * | 3/1999 | Singer et al. .......... 379/202.01 |
| 5,904,728 A | * | 5/1999 | Tamai et al. ................. 701/211 |
| 6,456,935 B1 | * | 9/2002 | Ng .............................. 701/211 |
| 6,700,504 B1 | * | 3/2004 | Aslandogan et al. ........ 340/901 |
| 2002/0026281 A1 | * | 2/2002 | Shibata et al. .............. 701/208 |
| 2003/0028314 A1 | * | 2/2003 | Nagamune ................. 701/202 |
| 2003/0086562 A1 | * | 5/2003 | Wong et al. ........... 379/420.01 |
| 2003/0223602 A1 | * | 12/2003 | Eichler et al. .............. 381/309 |
| 2004/0013252 A1 | * | 1/2004 | Craner ................... 379/142.01 |

FOREIGN PATENT DOCUMENTS

| EP | 0 503 214 A1 | 9/1992 |
| GB | 2 219 658 A | 12/1989 |
| GB | 2 287 535 A | 9/1995 |
| GB | 2 382 288 A | 5/2003 |
| JP | 07-019887 | 1/1995 |
| JP | 07-057190 | 3/1995 |
| WO | 97/43599 | 11/1997 |
| WO | 99/67904 | 12/1999 |
| WO | 01/35600 A2 | 5/2001 |
| WO | 01/55833 | 8/2001 |

OTHER PUBLICATIONS

"Learning's in the air: museums, microcosms, and the future f the mobile net," *Mpulse: A Cooltown Magazine,* Internet: <http://www.cooltown.com/mpulse/0901–museums.asp-?print=yes> 3 pages total (Mar. 13, 2002).

(List continued on next page.)

*Primary Examiner*—Thomas G. Black
*Assistant Examiner*—Tuan C To

(57) ABSTRACT

An audio-based guide arrangement is provided for guiding a user along a target path by the use of stereo audio cues. The user's current location is sensed and compared to the target path. Sounds are fed to the user through left and right audio channels and these sounds are varied to indicate the user's divergence from the target path. In particular, the left and right channel sounds are varied in a complementary manner preferably by increasing the frequency of the sound in one channel whilst simultaneously decreasing the frequency of the sound in the other channel and vice versa.

22 Claims, 4 Drawing Sheets

OTHER PUBLICATIONS

"Radar Recollections—A Bournemouth University / ChiDE/ HLF project," Internet: <http://chide.bournemouth.ac.uk/Oral_History/Talking_About_Technology/radar_research/glossary.html> 10 pages total (Jul. 18, 2003).

Bederson, B.B., "Audio Augmented Reality: A Prototype Automated Tour Guide," *ACM Human Computer in Computing Systems conference* (*CHI '95*) pp 210–211, Internet: <http://www.cs.umd.edu/~bederson/papers/chi-95-aar/index.html> 4 pages total (Feb. 2, 2002).

Ross, D.A., et al., "Evaluation of orientation interfaces for wearable computers," *The Fourth International Symposium on Wearable Computers 2000, IEEE,* pp 51–58 (2002).

Spasojevic, M., et al., "A Study of an Augmented Museum Experience," 6 pages total.

U.S. Appl. No. 10/635,869, filed Aug. 5, 2003, Hull.

* cited by examiner

METHOD AND ARRANGEMENT FOR GUIDING A USER ALONG A TARGET PATH

FIELD OF THE INVENTION

The present invention relates to a method and arrangement for guiding a user along a target path such as, for example, a path through an exhibition space.

BACKGROUND OF THE INVENTION

In many mobile computing applications, there may be a requirement that users follow a particular path through a physical space. However, the physical space may be devoid of physical signs to indicate a specified path though that space. There are many uses of audio to guide navigation, including the use of audio beacons to attract users to its source, and the use of sonar to indicate obstacles ahead. A system of audio cues known as the "Oboe" system was also used in the Second World War to guide the pilots of RAF (the British Royal Air Force) bombers to targets; in this system monaural audio cues were presented to the pilot through headphones and represented three ternary states, namely: turn left, turn right, and straight ahead.

It is an object of the present invention to provide sound based cues for guiding a user along a target path.

SUMMARY OF THE INVENTION

According to one aspect of the present invention, there is provided a method of guiding a user along a target path, comprising the steps of:

(a) determining the position of the user relative to the target path; and (b) providing respective audio cues to the user via left and right audio channels, these cues being indicative of the relative position determined in step (a) and varying in a complementary manner over at least a range of values of said relative position without thereby forming a spatialized virtual sound source the position of which changes with the value of said relation position.

According to another aspect of the present invention, there is provided an arrangement for guiding a user along a target path, comprising:

relative-location determining means for determining the position of the user relative to the target path; and audio-cue means for providing respective audio cues to the user via left and right audio channels, the audio-cue means being arranged to cause these cues to be indicative of the relative position determined by the relative-location determining means and to vary in a complementary manner over at least a range of values of said relative position without thereby forming a spatialized virtual sound source the position of which changes with the value of said relation position.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
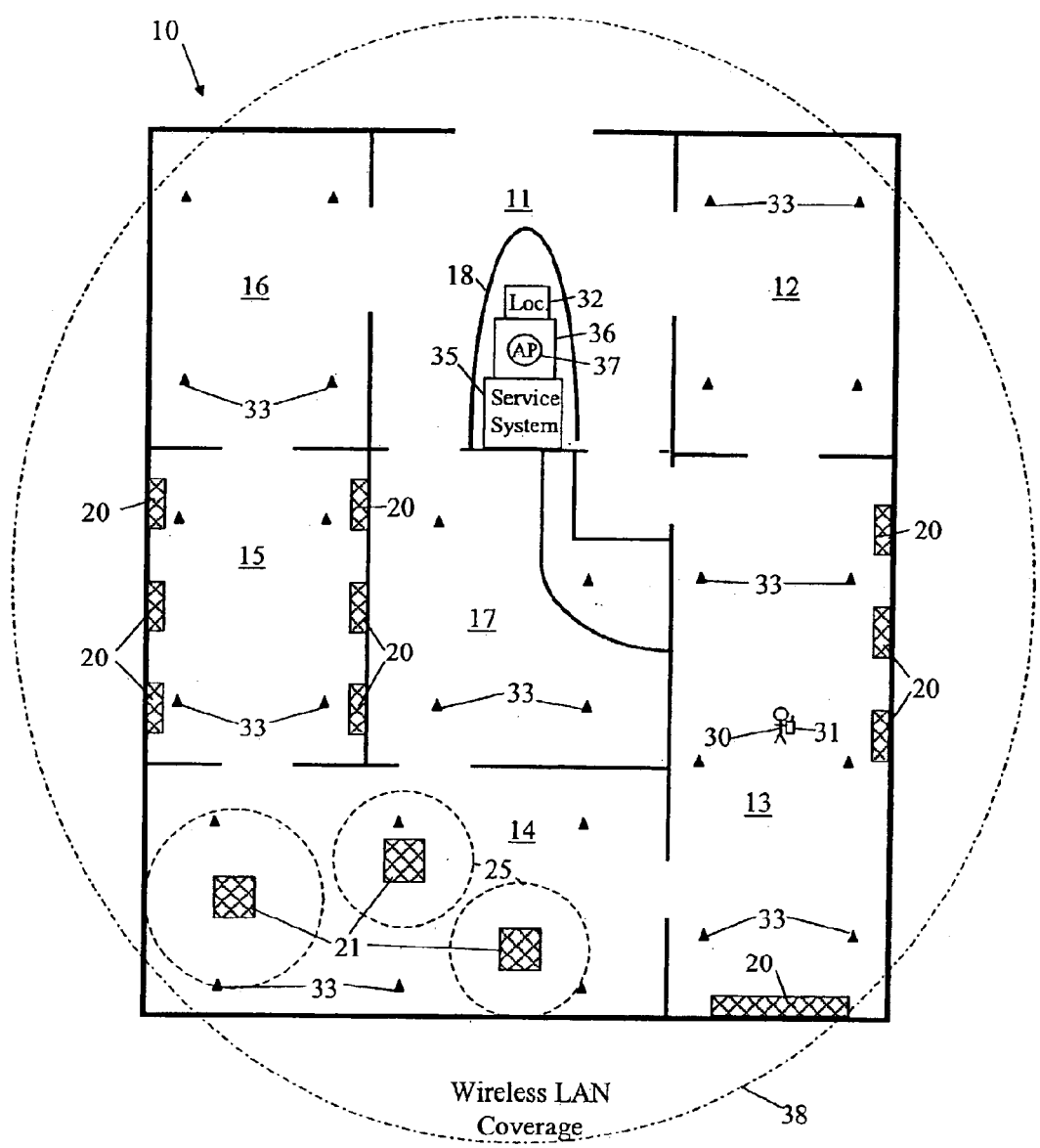
FIG. 1 is a diagram of an exhibition hall having an arrangement for delivering relevant media objects to visitors in a timely manner as the visitors encounter items of interest in the hall.

FIG. 1 depicts an exhibition hall 10 having rooms 11 to 17 where:

room 11 is an entrance foyer with reception desk 18;

room 12 is a reference library;

rooms 13, 14 and 15 are used for displaying exhibits in the form of real-world objects, namely paintings 20 and sculptures 21;

room 16 is empty of real-world exhibits; and room 17 is a cafeteria.

On entering the exhibition hall 10, a user 30 collects a mobile device 31 from the reception desk 18 (or the user may have their own device). This device 31 cooperates with location-related infrastructure to permit the location of the user in the hall 10 to be determined. A number of techniques exist for enabling the location of the user to be determined with reasonable accuracy and any such technique can be used; in the present example, the technique used is based on an array of ultrasonic emitters 33 (represented in FIG. 1 by black triangles) positioned at known locations in each room (typically suspended above human level). The emitters 33 are controlled by controller 32 to send out emitter-specific emissions at timing reference points that are indicated to the mobile device 31 by a corresponding radio signal sent by the controller 32. The device 31 is capable of receiving both the timing reference signals and the emissions from the ultrasonic transmitters 33. The device 31 is also pre-programmed with the locations of these emitters and is therefore able to calculate its current location on the basis of the time of receipt of the emissions from the different emitters relative to the timing reference points.

The exhibition hall is equipped with a wireless LAN infrastructure 36 comprising a distribution system and access points 37. The wireless LAN has a coverage encompassing substantially all of the hall 10, the boundary of the coverage being indicated by chain-dashed line 38 in FIG. 1. The wireless LAN enables the mobile device to communicate with a service system 35 to download feature items (digital media objects) appropriate to any feature (such as an exhibit 20 or 21) corresponding to the current location of the user. In the present example, the determination of when the location of the user (as determined by the device 31 in the manner already described) places the user near a feature with associated feature items, is effected by the service system; however, it is also possible to have the device 31 carry out this determination provided it is supplied with the appropriate information about feature location.

It will be appreciated that communication between the device 31 and service system 35 can be effected by any suitable means and is not limited to being a wireless LAN.

Figure 2:
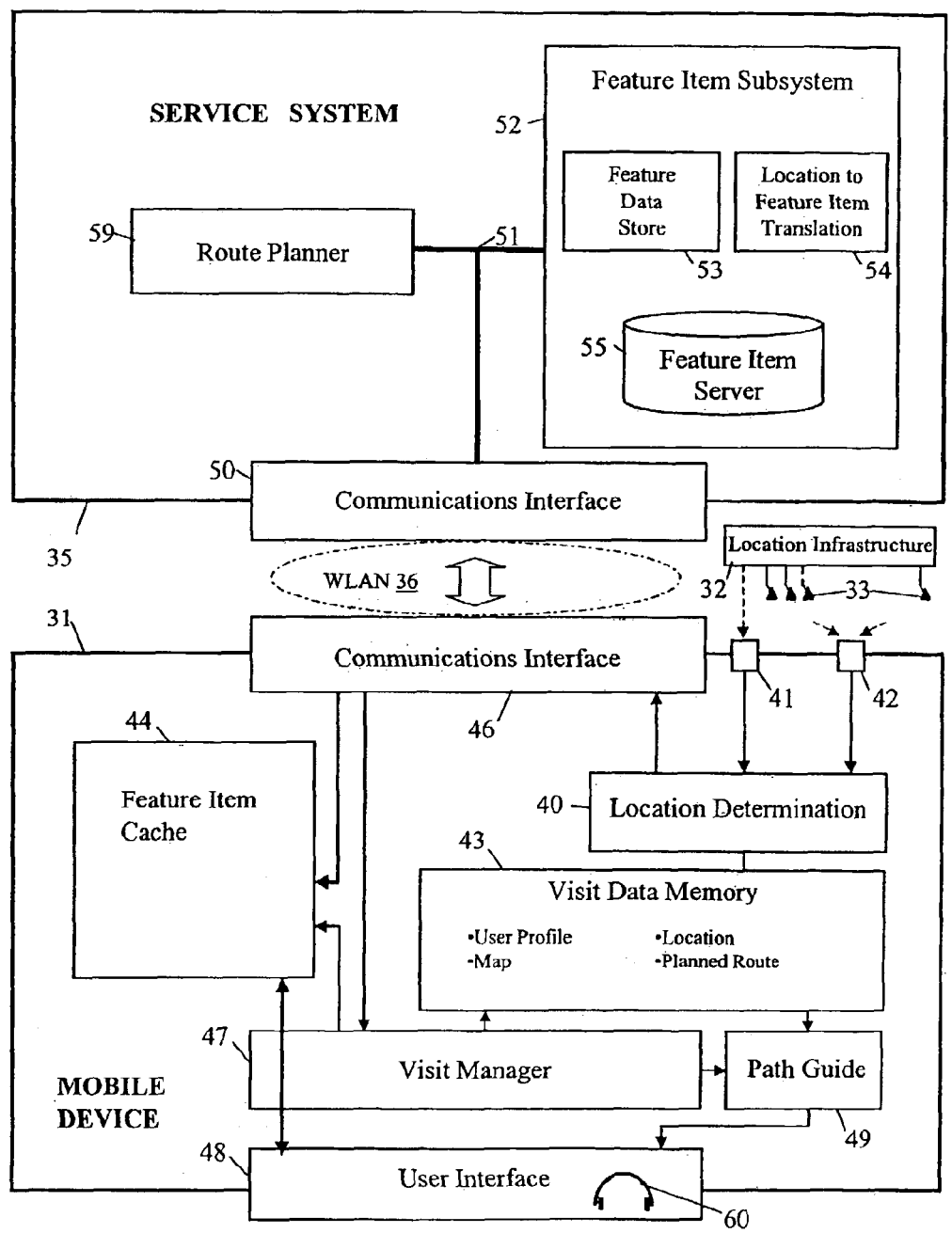
FIG. 2 is a diagram of a mobile device and service system used in the FIG. 1 arrangement.

FIG. 2 shows the mobile device 31 and service system 35 in more detail. More particularly, the mobile device 31 comprises the following functional blocks:

- A location determination subsystem 40 with an associated timing reference receiver 41 and ultrasonic receiver 42 for receiving the timing reference signals from the location infrastructure 32 and the emissions from the ultrasonic emitters 33 respectively; the location determination subsystem 40 is operative to use the outputs of the receivers 41 and 42 to determine the location of the mobile device (as already described above) and to send location reports to the service system 35.
- A visit data memory 43 for holding data about the current "visit"—that is, the current tour of the hall 10 being undertaken by the user of the mobile device 31.
- A feature-item cache 44 for caching feature items delivered to the mobile device 31 from the service system 35.
- A communications interface 46 for enabling communication between the mobile device 31 and the service system 35 via the wireless LAN infrastructure 36.
- A user interface 48 which may be visual and/or sound based; in one preferred embodiment the output to the user is via stereo headphones 60.
- A visit manager 47 typically in the form of a software application for providing control and coordination of the other functions of the mobile device 31 in accordance with input from the user and the service system 35.
- A visit path guide 49 for giving the user instructions/indicators for following a planned route around the hall 10.

Much of the foregoing functionality will typically be provided by a program-controlled general purpose processor though other implementations are, of course, possible.

The visit data held by memory 44 will typically include a user/device profile data (for example, indicating the subjects of interest to the user, the intended visit duration, and the media types that can be handled by the device), an electronic map of the hall 10, the user's current location as determined by the subsystem 40, and details of a planned route being followed by the user.

The service system 35 comprises the following main functional elements:

- A communications interface 50 for communicating with the mobile device 50 via the wireless LAN infrastructure 36.
- An internal LAN 51 (or other interconnect arrangement) for interconnecting the functional elements of the service system.
- A feature-item subsystem 52 for providing feature items to a user according to their current location. This subsystem 52 comprises a feature data store 53 for storing data about each feature of interest in the exhibition hall 10, a location-to-feature item translation unit 54, and a feature-item server 55 for serving an identified feature item to the mobile device 31. The data held by store 53 on each feature typically includes a feature identifier, the subject of the feature, the corresponding real-world location and a list of one or more feature items associated with the feature.
- A route planner 59 for responding to requests from the mobile device 31 for a route to follow to meet certain constraints supplied by the user (such as topics of interest, time available, person or tour to follow, an exhibit or facility to be visited, etc). In providing a planned route, the route planner will typically access data from feature data store 53. The route planner 59 can conveniently hold a master map of the hall 10 for use by itself and for download to each mobile device 31 at the start of each new visit and/or whenever the master map is changed.

The functional elements of the service system 35 can be configured as a set of servers all connected to the LAN 51 or be arranged in any other suitable manner as will be apparent to persons skilled.

It is to be understood that the split of functionality between the mobile device 31 and service subsystem 35 can be varied substantially form that indicated for the FIG. 2 embodiment; indeed all functionality can be provided either entirely by the mobile device 31 (with all feature items being stored in the device) or by the service system 35 (with the presentation of feature items to a user being by means of fixed input/output devices located around the hall near the locations associated with the features concerned).

In general terms, a user starting a visit can request a route to follow using the user interface 48 of the mobile device 31 to indicate parameters to be satisfied by the route. This route request is sent by the visit manager to route planner 59 and results in the download to the mobile device 31 of a planned route. The path guide 49 then provides the user (typically, though not necessarily, only when asked) with guide indications to assist the user in following the planned route. Where the interface 48 includes a visual display, this can conveniently be done by displaying a map showing the user's current location and the planned route; in contrast, where only an audio interface is available, this can be done by audio cues to indicate the direction to follow. A user need not request a planned route and in this case will receive no guide indications. A user may request a route plan at any stage of a visit (for example a route to an exhibit of interest).

As the user moves through the hall, the location determination subsystem 40 sends periodic location reports (see FIG. 3) to the feature-item subsystem 52 of the service system 35 via the wireless LAN 36. When a location report is received by the subsystem 52, it passes on the user's current location to the feature translation unit 54 which queries the feature data store 53 to determine which feature, if any, is currently being visited by the user and thus what feature items are relevant to the user in their current location. The identities of feature items identified by the unit 54 are then either used to cause the feature-item server 55 to send the corresponding feature items to the device 31 directly, or are passed back to the visit manager 47 of the device 31 which is then responsible for causing the corresponding feature items to be retrieved from the server 55. In either case, whenever the device receives a feature item it stores it in memory 44 and presents it (with or without user prompting) to the user via interface 48.

Having described the general operation of the mobile device 31 and service system 35, a more detailed description will now be given of how a user can be guided along a route by an audio-based implementation of the path guide unit 49 of device 31.

However a route is determined by the route planner 59, details of the planned route are passed back to the mobile device 31 for storage in the memory 43. Alternatively, a route to follow may have been determined in the device itself, for example by the user specifying on the stored map locations to be visited and the visit manager 47 locally determining the shortest path between these locations. Typically, the route will have been specified by a series of locations defining a path. The path guide unit 49 is operative to use these stored details to provide guidance to the user for following the path concerned. Whilst the path guide unit 49 can be arranged to use a visual display of user interface 48 to provide this guidance, an audio-based embodiment of unit 49 is described below for using non-verbal audio output to guide a user along a specified path (referred to below as the "target" path).

Figure 3:
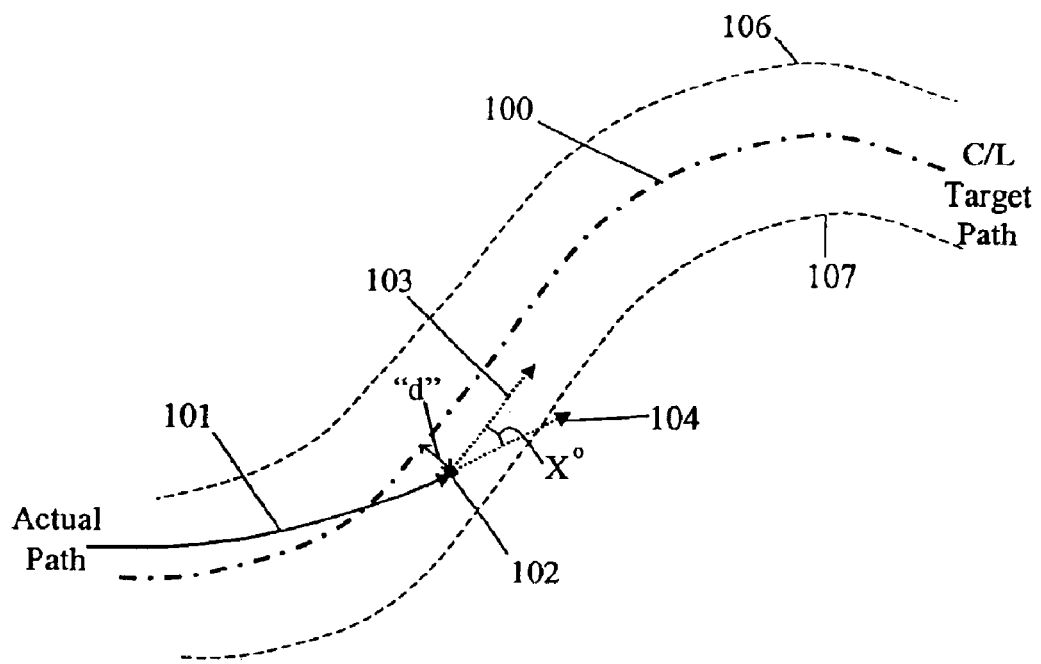
FIG. 3 is a diagram showing a target path to be followed by the user using audio guidance sounds generated by an audio-based embodiment of a path guide unit of the FIG. 2 mobile device.

More particularly, in the audio-based embodiment of unit 49, stereo audio cues are provided to the user that indicate how close the user is to the centreline of the target path (see chain-dashed line 100 in FIG. 3). These cues are typically presented through stereo headphones 60 but other audio output arrangements are possible such as small shoulder-mounted loudspeakers. In FIG. 3 the actual path taken by the user is indicated by arrow 101 with the user's current location being at the point referenced 102. At point 102, arrows 103 and 104 respectively indicate the direction of pointing of the path centre-line 100 and the current direction of moving of the user, the angle between the two having a value of X degrees. The perpendicular distance from the target path 100 to the user's current location 102 has value "d".

In general terms, the audio-based embodiment of the unit 49 operates by repeatedly carrying out the following steps:

determine the distance "d" using the most recent location data stored in memory 43 by the location determination subsystem 40 and the details of the target path, also stored in memory 43;

render audio cues in each of the stereo channels according to a function that relates the distance "d" to an audio characteristic such as frequency or intensity.

Figure 4:
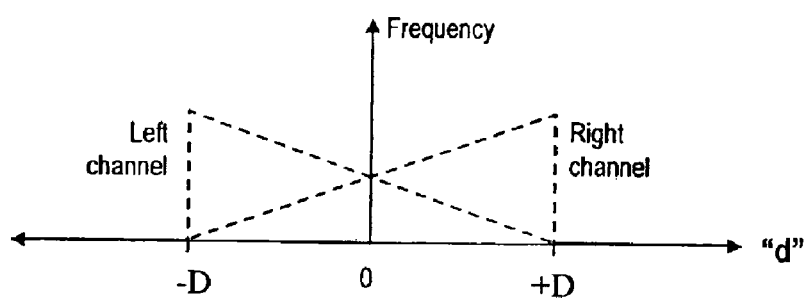
FIG. 4 is a diagram showing variation in frequency with distance from the target-path centreline, of the audio guidance sounds produced by the audio-basedt embodiment of the path guide unit.

The cues to the left and right audio channels are preferably controlled to vary in a complementary manner—thus as the value of "d" changes, the audio characteristic used to represent the distance "d" is changed in one sense for the left channel and in the opposite sense for the right channel. For example, and as illustrated in FIG. 4, both channels can be arranged to carry a tone of the same frequency when the user is on the centreline of the target path. As the user moves away from the centreline, the frequency of the tone in one channel is caused to rise, and that in the other channel is caused to fall. In order to move back to the centreline, the user must move to bring the left and right channel tones back to a common frequency. Such balancing of the frequency of two tones is akin to tuning a musical instrument and can exploit the familiar phenomenon of minimising the beat frequency between the tones.

It may be noted that the audio characteristic used to represent the distance "d" is preferably not simply the volume of the audio cues applied left and right audio channels where these audio cues are of the same frequency, as this will result in the user's brain interpreting the audio cues as a spatialized virtual sound source the position of which varies with the distance "d". Whilst such a virtual sound source can be controlled to appear to lie in the direction of some arbitrary point on the path centreline 100, having the user perceive the left and right audio cues as distinct cues has been found to be a more sensitive position indicator, at least for some users.

In the FIG. 4 example, as a user moves off the centreline to the left, the frequency of the tone carried by the left channel increases and that of the right channel decreases; it will be appreciated that the reverse policy could be applied—that is, the frequency of the left-channel tone could decrease as the user moves to the left whilst that of the right-channel tone increases.

It will also been seen in the FIG. 4 example that changing the frequencies of the channel tones is limited to positive and negative values of "d" below a certain limit magnitude "D"—outside this range of values, the channel tone frequencies are both zero. In effect, the threshold value D defines a corridor of width 2D centred on the centreline of the target path 100. In FIG. 3, the boundaries of this corridor (the "walls" of the corridor) are indicated by dashed lines 106, 107.

The complementary variation of the controlled audio characteristic of the left and right audio channels need not extend across the whole range of the parameter "d" for which variations of this characteristic are produced. Thus in the FIG. 4 example, as the user moves to the left of the centreline the frequency of the right-channel tone can fall to zero prior to the left-channel tone reaching its maximum frequency at distance "−D" from the centreline. It is also possible to arrange for there to be a plateau region either side of the target-path centreline within which the tones in the two channels do not change as the user moves towards and away from the centreline. It is further possible, though not preferred, to do away with any range in which complementary variation takes place—for example, in a central region either side of the target-path centreline no tones are generated but as the user moves outside of this region to one side or the other a tone is produced in the audio channel on that side.

Furthermore, the unit 49 can be arranged to vary a second characteristic of the audio signal to indicate the desired direction of travel along the path. For example, where channel tone frequency is used to indicate the distance "d" from the centreline as described, the loudness (intensity) of the tones can be increased progressively along the path from start to finish (or from the start of a path segment to the end of the segment) to indicate the direction to move along the path. A drawback of this approach is that it requires the user to be moving before it is apparent whether or not the user is moving in the correct direction. If a user stops along the path and turns for any reason, it will not be immediately apparent in which direction the user should set off when wishing to re-commence following the target path.

This drawback is overcome in the specific implementation of the audio-based embodiment of the path guide unit 49 described below with reference to FIGS. 5 and 6. In this implementation, unit 49 has four main states (see FIG. 5), namely:

a STANDBY state 110 in which unit 49 resides when not actively providing audio cues to the user;

a START state 111 entered when the unit first starts to give audio cues to the user for moving along a target path—in this state, the user is always initially located on the path centreline and is assumed not to be moving;

a MOVING state 112 in which the unit resides when operating to give audio cues to a user that has been detected as moving; and a STOPPED state 113 in which the unit resides when operating to give audio cues to a user that has been detected as having stopped.

Figure 5:
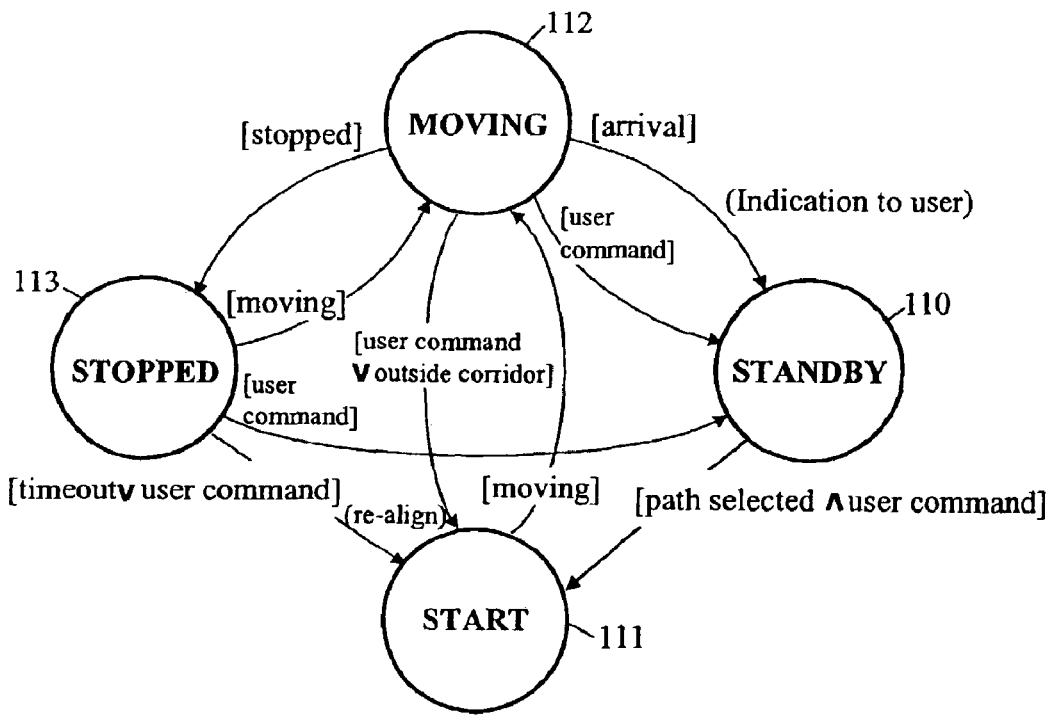
FIG. 5 is a state diagram of an example specific implementation of the audio-based embodiment of the path guide unit.
Figure 6:
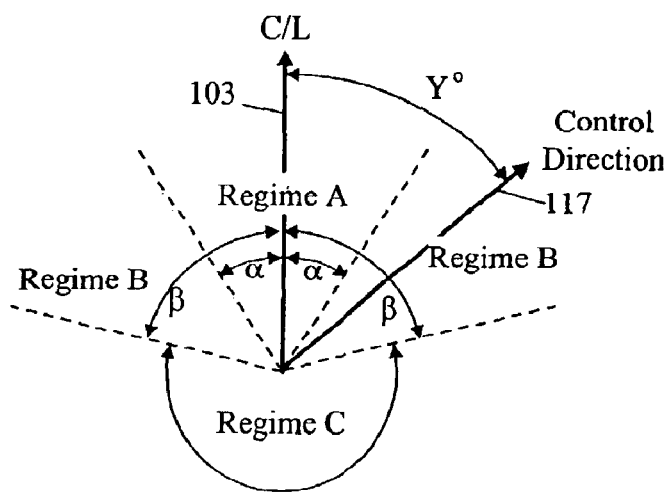
FIG. 6 is a diagram showing how the control regime employed by the FIG. 5 implementation of the path guide unit, varies with the angle of moving/facing of the user relative to the target-path centreline.

In the FIG. 5 state diagram, conditions to be satisfied to transit between states are indicated by the legends in square brackets on the arcs between states, and actions associated with transitions are indicated by legends in round brackets.

In each of the active states (that is, all states except the Standby state 110), the unit 49 operates according to one of three control regimes A, B and C in dependence on the angle Y° (see FIG. 6) between the current direction of pointing 103 of the target-path centreline and a control direction 117.

More particularly, control regime A applies when the angle Y has a magnitude of less than $\alpha°$, control regime B applies when the angle Y has a value in the range (+$\alpha°$ to +$\beta°$) or (−$\alpha°$ to −$\beta°$), and control regime applies for all other values of angle Y.

For the Start state 111 and the Stopped state 113, the control direction 117 is the current direction of facing of the user. This direction is measured, for example, by an electronic compass mounted on stereo headphones of the user to give an absolute direction of facing of the user, the direction of pointing of the centreline of the target path also being known in absolute terms through an absolute reference direction stored for the map of the hall held in memory 43 (the target path being specified with respect to the map).

For the Moving state 112, the control direction 117 is the current direction of moving of the user (that is, direction 104 in FIG. 3 in which case angle Y equals angle X of FIG. 3). The direction of moving of the user is determined, for example, by using the last two measured locations of the user.

The behaviour exhibited by the unit 49 in each of the control regimes is as follows:

Regime A—the user is presented with stereo audio cues with each stereo channel having a characteristic that varies with the distance "d" as described above, for example, with respect to FIGS. 3 and 4;

Regime B—as for regime A with the addition of a world-stabilized sound cue generated so as to appear to come from a point in space a long way off along a projection of the current direction of pointing of the target-path centreline. By "world-stabilized" is meant that the direction from the user's current position to the sound-cue source point does not vary relative to a real-world fixed reference direction as the user turns their head or body. Generation of a world-stabilized sound cue can be readily effected using a 3D audio spatialisation processor provided that the centreline of the audio output arrangement is known (where the audio output arrangement is stereo headphones, this centreline is simply the direction of facing of the user). This sound cue is generated to be a sound distinct from the audio cues used to indicate the distance "d" and serves to indicate to the user the direction in which the user should face to be pointing along the target path; this sound cue is referred to as the target-path direction cue below.

Regime C—Only the target-path direction cue is provided to the user to enable them to correctly orientate themselves for moving along the target path.

In operation, the user first selects a target path whilst the unit 49 is in its Standby state 110, this target path starting from the user's current location. Upon a user command being given to start the guidance process, the unit 49 transits to the Start state 111 in which the user is positioned on the centreline of the target path and the control direction 117 is the user's direction of facing. If the user is facing within $\alpha°$ of the centerline direction of the target path, the unit 40 operates in control regime A to provide the user with stereo audio cues that will initially be balanced and the user can set off in their direction of facing knowing they are proceeding in roughly the correct direction. If, however, the user is facing away from the target-path centerline direction of pointing by more than $\alpha°$, unit 49 will operate in control regime B or C providing the user with the target-path direction cue to permit the user to turn in the correct direction before starting off. By also providing the stereo audio cues in regime B when the user's initial direction of facing is not completely inappropriate, the user can start moving without having to fully orientate themselves first.

As the user moves off, the fact that they are moving is detected (generally by detecting the a change in sensed location) and the unit 49 transits to the Moving state 112. Although the unit 49 continues to operate in control regime A, B or C according to the value of the angle $\alpha°$, the control direction is now the direction of movement of the user—in other words, the direction of facing of the user becomes irrelevant to the cues provided to the user and they can turn their head from side to side as they move along without this affecting the cues they receive. If the user starts moving in a direction that is greater than $\alpha°$ (but less than $\beta°$) away from the path centreline direction, the user will not only hear changes in the stereo audio cues caused by changes in the distance "d", but also hear the target-path direction cue to help them correct their direction of movement.

If the user stops for more than a short period (as detected, for example, by the detected location of the user remaining unchanged for n readings where n is an integer greater than one), the unit 49 transits to the Stopped state 113. This state is similar to the Start state 111 except that the user is not necessarily positioned on the path centreline. Thus, the user will receive audio cues regarding the distance "d" and/or the path centreline direction according to the angle between the latter and the direction of facing of the user.

Upon the user moving off again from the Stopped state 111, the unit 49 transits back to the Moving state 112.

Upon the user arriving at the endpoint of the target path, the unit 49 transits out of the Moving state 112 back to the Standby state 110 and, in doing so, provides an appropriate indication to the user that they have arrived at their destination.

If whilst in the Moving state 112, a user should move outside of the corridor defined by the value D for the distance "d", the unit 49 temporarily transits back to the Start state 111 and as it does this, the target path is re-aligned to pass through the user's current location. In other words, the path is moved to put the user back on it. Since the user is moving, the unit 49 quickly returns to the Moving state 112. A similar path re-alignment by transiting the unit 49 back to the Start state 111 is also effected if the user remains in the Stopped state 113 for more than a predetermined timeout period.

Finally with respect to the FIG. 5 state diagram, the user can by user command cause the unit to move from any of the active states 111-113 back to the Standby state 110 in which no audio cues are given; the user may also, by user command, cause the unit 49 to transit from the Moving state or Stopped state to the Start state 111 to cause the target path to realign to have its centreline pass through the user's current location.

Many variants are, of course, possible to the above-described implementation of the audio-based embodiment of unit 49. For example, in control regime B rather than providing a target-path direction cue of the form described to supplement the stereo audio cues indicative of the distance "d", these latter cues can simply be supplemented by a distinctive sound in the audio channel of the side of the target path to which the control direction is pointing. In this case, regime C can either be this distinctive sound alone or the target-path direction cue as before. A further alternative to using the target-path direction cue in control regime B is to make the stereo audio cues that are indicative of the distance "d", also responsive to the fact that the control direction is pointing towards one side of the path and away from the other. This can be done, for example, by notionally displacing the location of the user perpendicularly to the path centreline towards the side of the path pointed to by the control direction, the amount of this displacement being dependent on the magnitude of the angle Y°; the value of the distance "d", and thus the sound of the stereo audio cues, is then determined based on the notional position of the user after the notional displacement.

In a further variant, the value of α° or β° is set to zero—in other words, control regime A or control regime B is eliminated. With regard to the determination of the position of the user relative to the target path, whilst in the above-described arrangements this has involved a direct measure of the perpendicular distance "d" from the target-path centreline to the user's current position, it will be appreciated that indirect measures are alternatively possible such as determining the distance of the user from the nearest corridor wall 106, 107.

As already noted, the distribution of functionality between mobile devices and the service system is not limited to the distributions described above since the availability of communication resources makes it possible to place functionality where most suitable from technical and commercial considerations. Furthermore, in the foregoing reference to a mobile device is not to be construed as requiring functionality housed in a single unit and the functionality associated with a mobile device can be provided by a local aggregation of units.

The above described methods and arrangements are not limited to use in exhibition halls or similar public or private buildings; the methods and arrangements disclosed can be applied not only to internal spaces but also to external spaces or combinations of the two.

What is claimed is:

1. A method of guiding a user along a target path, comprising:
   (a) determining the position of the user relative to the target path; and
   (b) providing respective audio cues to the user via left and right audio channels, these cues being indicative of the relative position determined in step (a) and varying in a complementary manner over at least a range of values of said relative position without thereby forming a spatialized virtual sound source the position of which changes with the value of said relative position.

2. A method according to claim 1, wherein the same audio characteristic of the audio cues delivered by the left and right channels is varied with changes in said relative position over said range of values, this characteristic being varied in one sense for the cues delivered by the left channel and in the opposite sense for cues delivered by the right channel as said relative position changes.

3. A method according to claim 2, wherein said audio characteristic is frequency.

4. A method according to claim 1, wherein the same audio characteristic of the audio cues delivered by the left and right channels is varied with changes in said relative position over said range of values, said audio characteristic being increased/decreased in magnitude for one said channel as the user moves away from the target path to the side of the path corresponding to that channel, and the said audio characteristic of the other channel being correspondingly decreased/increased in magnitude.

5. A method according to claim 1, wherein said relative position is determined in step (a) in terms of the perpendicular distance between a centreline of the target path and the user's current position.

6. A method according to claim 1, wherein the audio cues are only provided whilst the user is within a predetermined distance of the target path centreline.

7. A method according to claim 1, wherein a characteristic of the audio cues is varied in dependence on distance moved along the target path.

8. A method according to claim 1, wherein the method includes the following, carried out when the user is moving:
   determining the angle between the user's direction of moving and the direction of pointing of the target-path centreline;
   where this angle is greater than a predetermined magnitude, providing an audible indication to the user of the direction of pointing of the target-path centreline.

9. A method according to claim 8, wherein said audible indication is one of:
   a synthesized sound source rendered to appear to emanate from a location along the direction of pointing of the target-path centreline;
   a sound signal, independent of said audio cues, provided in the sound channel corresponding to the side of the target path to which the direction of moving or direction of facing, as the case may be, is pointing; and
   a variation in said audio cues indicative of the side of the target path to which the direction of moving or direction of facing, as the case may be, is pointing.

10. A method according to claim 1, wherein the method includes the following, carried out when the user is stationary:
    determining the angle between the user's direction of facing and the direction of pointing of the target-path centreline;
    where this angle is greater than a threshold magnitude, providing an audible indication to the user of the direction of pointing of the target-path centreline.

11. A method according to claim 10, wherein said audible indication is one of:
    a synthesized sound source rendered to appear to emanate from a location along the direction of pointing of the target-path centreline;
    a sound signal, independent of said audio cues, provided in the sound channel corresponding to the side of the target path to which the direction of moving or direction of facing, as the case may be, is pointing; and
    a variation in said audio cues indicative of the side of the target path to which the direction of moving or direction of facing, as the case may be, is pointing.

12. An arrangement for guiding a user along a target path, comprising:
    relative-location determining means for determining the position of the user relative to the target path; and
    audio-cue means for providing respective audio cues to the user via left and right audio channels, the audio-cue means being arranged to cause these cues to be indicative of the relative position determined by the relative-location determining means and to vary in a complementary manner over at least a range of values of said relative position without thereby forming a spatialized virtual sound source the position of which changes with the value of said relative position.

13. An arrangement according to claim 12, wherein the audio-cue means is arranged to respond to changes in said relative position over said range of values by varying the same audio characteristic of the audio cues delivered by the left and right channels, the audio-cue means being operative to vary this characteristic in one sense for the cues delivered by the left channel and in the opposite sense for cues delivered by the right channel as said relative position changes.

14. An arrangement according to claim 13, wherein said audio characteristic is frequency.

15. An arrangement according to claim 12, wherein the audio-cue means is arranged to respond to changes in said relative position over said range of values by varying the same audio characteristic of the audio cues delivered by the left and right channels, the audio-cue means being operative to increase/decrease the magnitude of said audio characteristic for one said channel as the user moves away from the target path to the side of the path corresponding to that channel, and to correspondingly decrease/increase in magnitude the said audio characteristic of the other channel.

16. An arrangement according to claim 12, wherein the relative-location determining means is arranged to determine said relative position in terms of the perpendicular distance between a centreline of the target path and the user's current position.

17. An arrangement according to claim 12, wherein the audio-cue means is arranged to provide the audio cues only whilst the user is within a predetermined distance of the target path centreline.

18. An arrangement according to claim 12, wherein the audio-cue means is arranged to vary a characteristic of the audio cues in dependence on distance moved along the target path.

19. An arrangement according to claim 12, further comprising:

means for determining, for a moving user, the angle between the user's direction of moving and the direction of pointing of the target-path centreline; and means responsive to said angle being greater than a predetermined magnitude, to provide an audible indication to the user of the direction of pointing of the target-path centreline.

20. An arrangement according to claim 19, wherein said audible indication is one of:

a synthesized sound source rendered to appear to emanate from a location along the direction of pointing of the target-path centreline;

a sound signal, independent of said audio cues, provided in the sound channel corresponding to the side of the target path to which the direction of moving or direction of facing, as the case may be, is pointing; and a variation in said audio cues indicative of the side of the target path to which the direction of moving or direction of facing, as the case may be, is pointing.

21. An arrangement according to claim 12, wherein the method includes the further steps, carried out when the user is stationary, of:

means for determining, for a stationary user, the angle between the user's direction of facing and the direction of pointing of the target-path centreline; and means responsive to said angle being greater than a threshold magnitude, to provide an audible indication to the user of the direction of pointing of the target-path centreline.

22. An arrangement according to claim 21, wherein said audible indication is one of:

a synthesized sound source rendered to appear to emanate from a location along the direction of pointing of the target-path centreline;

a sound signal, independent of said audio cues, provided in the sound channel corresponding to the side of the target path to which the direction of moving or direction of facing, as the case may be, is pointing; and a variation in said audio cues indicative of the side of the target path to which the direction of moving or direction of facing, as the case may be, is pointing.

* * * * *